United States Patent
Chen (10) Patent No.: US 9,261,917 B2
(45) Date of Patent: Feb. 16, 2016

(54) PORTABLE ELECTRONIC DEVICE CAPABLE OF PIVOTING

(71) Applicant: Wistron Corporation, New Taipei (TW)

(72) Inventor: Hung-Chih Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 173 days.

(21) Appl. No.: 14/142,960

(22) Filed: Dec. 30, 2013

(65) Prior Publication Data

US 2014/0313655 A1 Oct. 23, 2014

(30) Foreign Application Priority Data

Apr. 18, 2013 (TW) .............................. 102113816 A (51) Int. Cl.
*G06F 1/16* (2006.01)

(52) U.S. Cl.
CPC .............. *G06F 1/1681* (2013.01); *G06F 1/162* (2013.01)

(58) Field of Classification Search
CPC ...................................................... G06F 1/1681
See application file for complete search history.

(56) References Cited

U.S. PATENT DOCUMENTS

| | | | | |
|---|---|---|---|---|
| 5,168,423 | A * | 12/1992 | Ohgami et al. | 361/679.07 |
| 6,275,376 | B1 * | 8/2001 | Moon | 361/679.06 |
| 6,771,494 | B2 * | 8/2004 | Shimano | 361/679.06 |
| 6,796,542 | B2 * | 9/2004 | Tsai | 248/291.1 |
| 6,980,423 | B2 | 12/2005 | Tanaka | |
| 7,129,931 | B2 * | 10/2006 | Pappas | 345/168 |
| 7,257,431 | B2 * | 8/2007 | Chen et al. | 455/575.3 |
| 7,619,882 | B2 * | 11/2009 | Nakajima et al. | 361/679.26 |
| 7,656,661 | B2 * | 2/2010 | Shaum | 361/679.55 |
| 8,050,018 | B2 * | 11/2011 | Takizawa | 361/679.06 |
| 8,955,196 | B2 * | 2/2015 | Bai | 16/367 |
| 2003/0167601 | A1 * | 9/2003 | Chen | 16/367 |
| 2004/0061999 | A1 * | 4/2004 | Takemoto et al. | 361/683 |
| 2004/0228081 | A1 * | 11/2004 | Lee | 361/683 |
| 2005/0237701 | A1 * | 10/2005 | Yu | 361/681 |

(Continued)

FOREIGN PATENT DOCUMENTS

| | | |
|---|---|---|
| TW | 562178 | 11/2003 |
| TW | 566597 | 12/2003 |

OTHER PUBLICATIONS

Office action mailed on Jun. 22, 2015 for the Taiwan application No. 102113816, filing date: Apr. 18, 2013, p. 1 line 12~14, p. 2 and p. 3 line 1~20.

*Primary Examiner* — Anthony Q Edwards (74) *Attorney, Agent, or Firm* — Winston Hsu; Scott Margo (57) ABSTRACT

A portable electronic device includes a host module, a display module, a pivoting mechanism and a moving component. The pivoting mechanism is connected to the host module and the display module and for pivoting the host module relative to the display module. The pivoting mechanism includes a base and a pivoting unit. The pivoting unit includes a lower pivoting component and an upper pivoting component. The lower pivoting component is installed on the base. The upper pivoting component is pivotally connected to the lower pivoting component in a first pivoting direction and installed on the display module, so that the display module rotates relative to the host module in the first pivoting direction. The moving component contacts an upper surface of the host module and moves relative to the upper surface as the display module rotates relative to the host module in the first pivoting direction.

19 Claims, 9 Drawing Sheets

(56) References Cited

U.S. PATENT DOCUMENTS

| | | | |
|---|---|---|---|
| 2006/0267947 A1* | 11/2006 | Nishiyama et al. | 345/168 |
| 2007/0104467 A1* | 5/2007 | Wang et al. | 386/125 |
| 2012/0224300 A1* | 9/2012 | Holman et al. | 361/679.01 |
| 2013/0335895 A1* | 12/2013 | Yu et al. | 361/679.01 |
| 2014/0015448 A1* | 1/2014 | Wikander et al. | 318/3 |

\* cited by examiner

PORTABLE ELECTRONIC DEVICE CAPABLE OF PIVOTING

BACKGROUND OF THE INVENTION

1. Field of the Invention

The present invention relates to a portable electronic device, and more especially, to a portable electronic device capable of pivoting stably.

2. Description of the Prior Art

There are two using modes of a rotatable notebook computer in the market presently. It can be used as a general notebook computer or as a tablet computer, so that users are able to choose from the two modes according to different requirements of situations. However, compared with the normal notebook computer, the pivoting mechanism of the rotatable notebook computer is designed to be in a center of a display module thereof. The display module might sway easily as the display module pivots relative to a host module. It results in a bottom of the display module colliding with an upper surface of the host module and a keyboard thereon, so as to scratch the host module and the keyboard. In consideration of it, it is a significant issue to design a pivoting mechanism capable of pivoting the display module relative to the host module stably nowadays.

SUMMARY OF THE INVENTION

The present invention is to provide a portable electronic device capable of pivoting stably for solving the above drawbacks.

According to the disclosure, the portable electronic device capable of pivoting includes a host module, a display module and a pivoting mechanism. The host module includes an upper surface, and a track is formed on the upper surface. The pivoting mechanism is connected to the host module and the display module. The pivoting mechanism includes a base, a pivoting unit and a moving component. The pivoting unit includes a lower pivoting component and an upper pivoting component. The lower pivoting component is installed on the base. The upper pivoting component is pivotally connected to the lower pivoting component in a first pivoting direction and installed on the display module, so that the display module rotates relative to the host module in the first pivoting direction. The moving component contacts an upper surface of the host module and moves relative to the upper surface of the host module as the display module rotates relative to the host module in the first pivoting direction, and the track is for guiding movement of the moving component.

According to the disclosure, the moving component is connected to the upper pivoting component.

According to the disclosure, the moving component is connected to the side of the display module.

According to the disclosure, the moving component is separated from the pivoting unit and connected to the side of the display module.

According to the disclosure, the moving component is a rolling component or a sliding component.

According to the disclosure, the rolling component is a ball or a wheel.

According to the disclosure, the track is made of inflexible material.

According to the disclosure, the track is formed in an arc shape.

According to the disclosure, the portable electronic device further includes a positioning structure. The positioning structure includes at least one concave structure and at least one positioning unit. The at least one concave structure is formed on the side of the display module. The at least one positioning component is installed on the base in a position corresponding to the at least one concave structure. The at least one positioning component is fixed inside the at least one concave structure for positioning the display module on the host module.

According to the disclosure, the at least one positioning component is made of flexible material.

According to the disclosure, the portable electronic device further includes a positioning structure. The positioning structure includes at least one first magnetic component and at least one second magnetic component. The at least one first magnetic component is installed on the side of the display module. The at least one second magnetic component is installed on the base in a position corresponding to the at least one first magnetic component. The at least one second magnetic component attracts the at least one first magnetic component for positioning the display module on the host module.

According to the disclosure, the portable electronic device further includes two hinge components respectively installed on two sides of the pivoting unit and inside the base, the two hinge components are being for pivoting the display module relative to the host module in a second pivoting direction different from the first pivoting direction.

According to the disclosure, a pivoting mechanism is disclosed. The pivoting mechanism is connected to a host module and a display module for pivoting the host module relative to the display module. The pivoting mechanism includes a base, a pivoting unit and a moving component. The pivoting unit includes a lower pivoting component and an upper pivoting component. The lower pivoting component is installed on the base. The upper pivoting component is pivotally connected to the lower pivoting component in a first pivoting direction and installed on the display module, so that the display module rotates relative to the host module in the first pivoting direction. The moving component is installed on a side of the display module. The moving component contacts an upper surface of the host module and moves relative to the upper surface of the host module as the display module rotates relative to the host module in the first pivoting direction.

The portable electronic device of the present invention includes the moving component on the side of the display module for contacting the upper surface of the host module when the display module pivots relative to the host module in the first pivoting direction so as to support the display module to pivot stably relative to the host module in the first pivoting direction. It can solve a conventional problem that the conventional display module sways easily so that the bottom of the conventional display module collides with the upper surface of the host module and the keyboard to scratch the host module and the keyboard when the display module rotates relative to the host module as the conventional pivoting mechanism is disposed in the center of the display module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
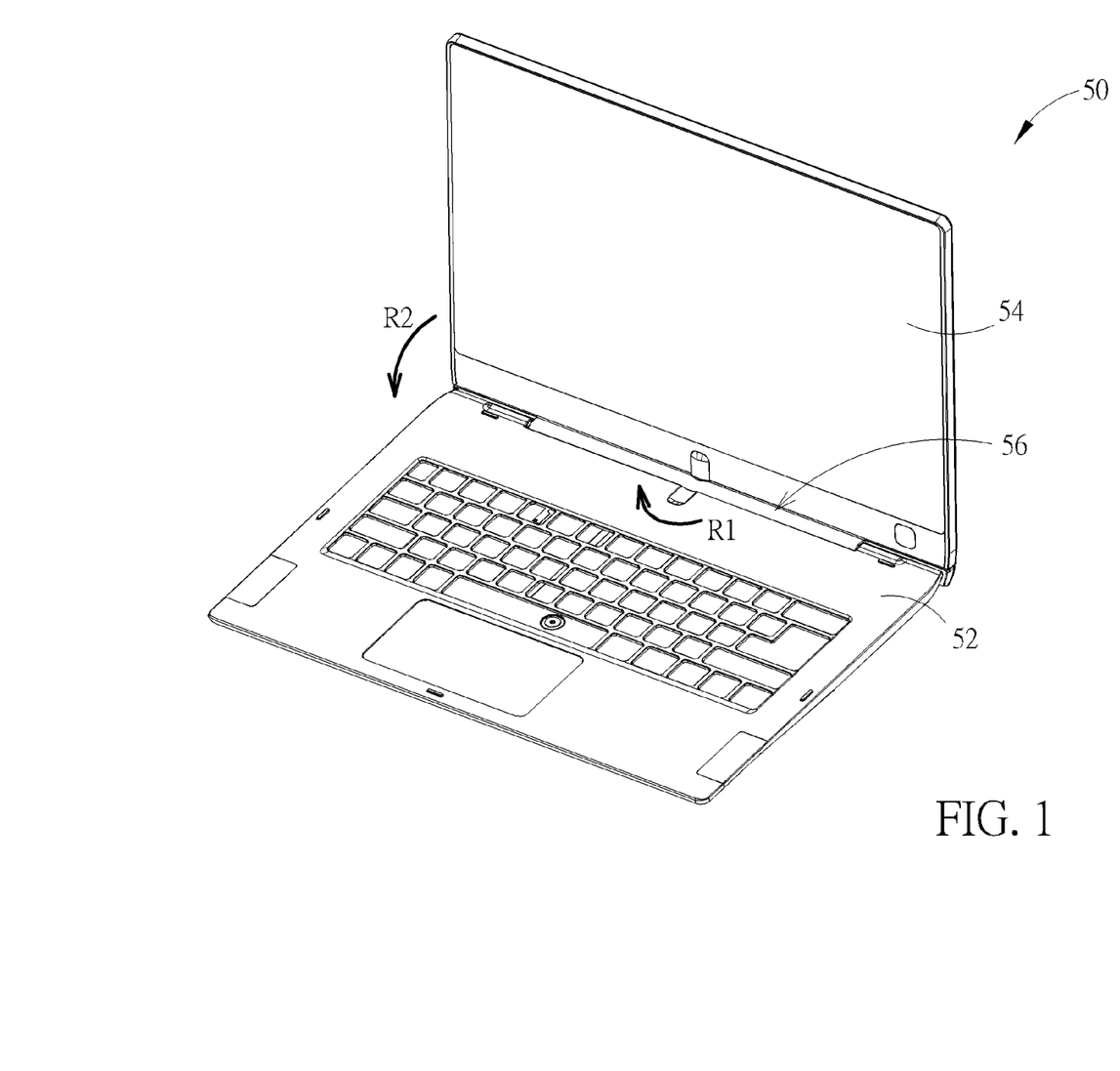
FIG. 1 is a diagram of a portable electronic device according to an embodiment of the present invention.

Please refer to FIG. 1. FIG. 1 is a diagram of a portable electronic device 50 according to an embodiment of the present invention. The portable electronic device 50 includes a host module 52, a display module 54 and a pivoting mechanism 56. The host module 52 includes internal electronic components, such as a CPU, hard discs, fans, memory sticks and expansion boards for controlling operation of the portable electronic device 50. The display module 54 is pivotally connected to the host module 52, and the display module 54 can be a touch display module, so that users can directly touch the touch display module to input any kinds of commands. The pivoting mechanism 56 is connected to the host module 52 and the display module 54, and the pivoting mechanism 56 is for pivoting the host module 52 relative to the display module 54.

Figure 2:
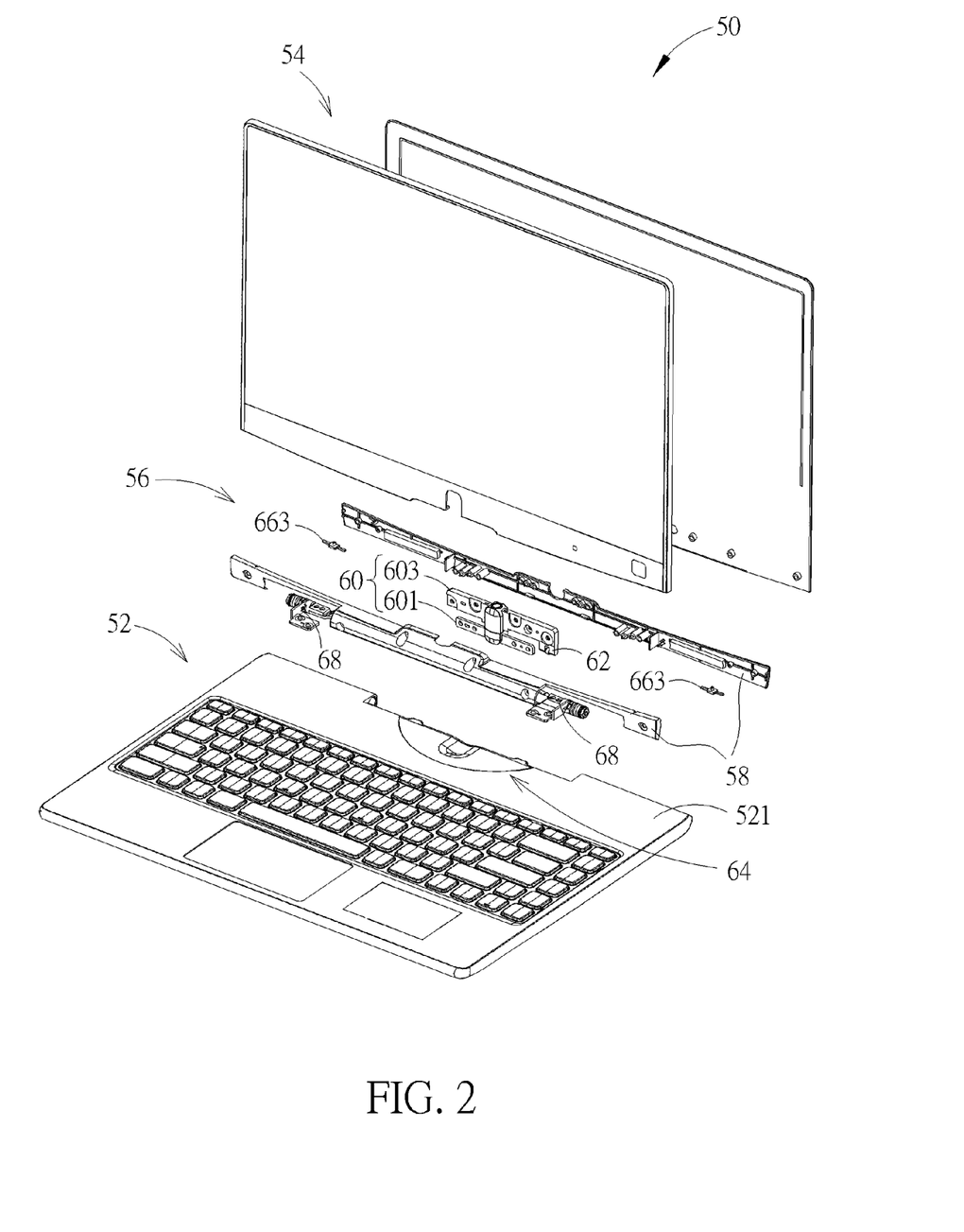
FIG. 2 is an exploded diagram of the portable electronic device according to the embodiment of the present invention.
Figure 3:
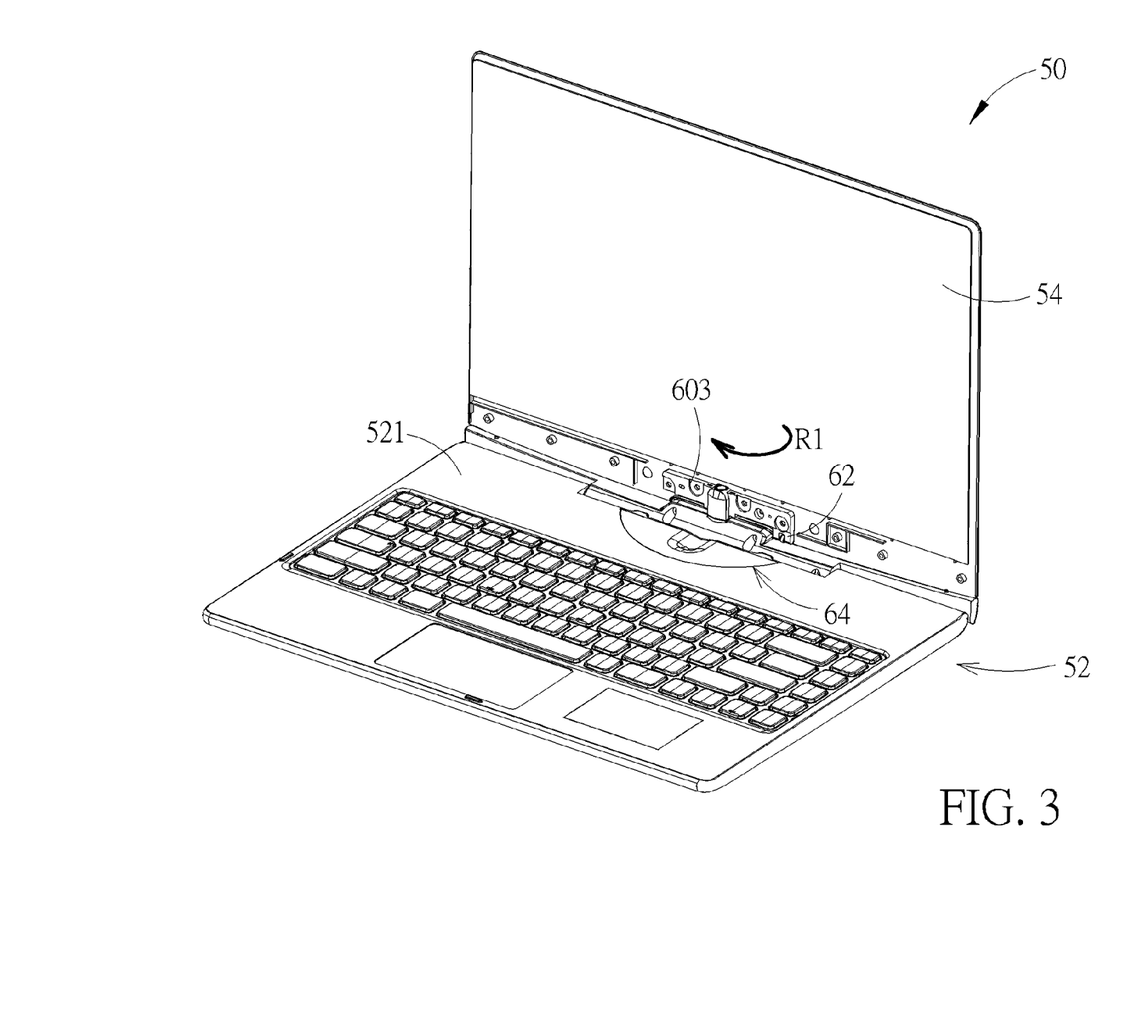
FIG. 3 is a partial structural diagram of the portable electronic device according to the embodiment of the present invention.
Figure 4:
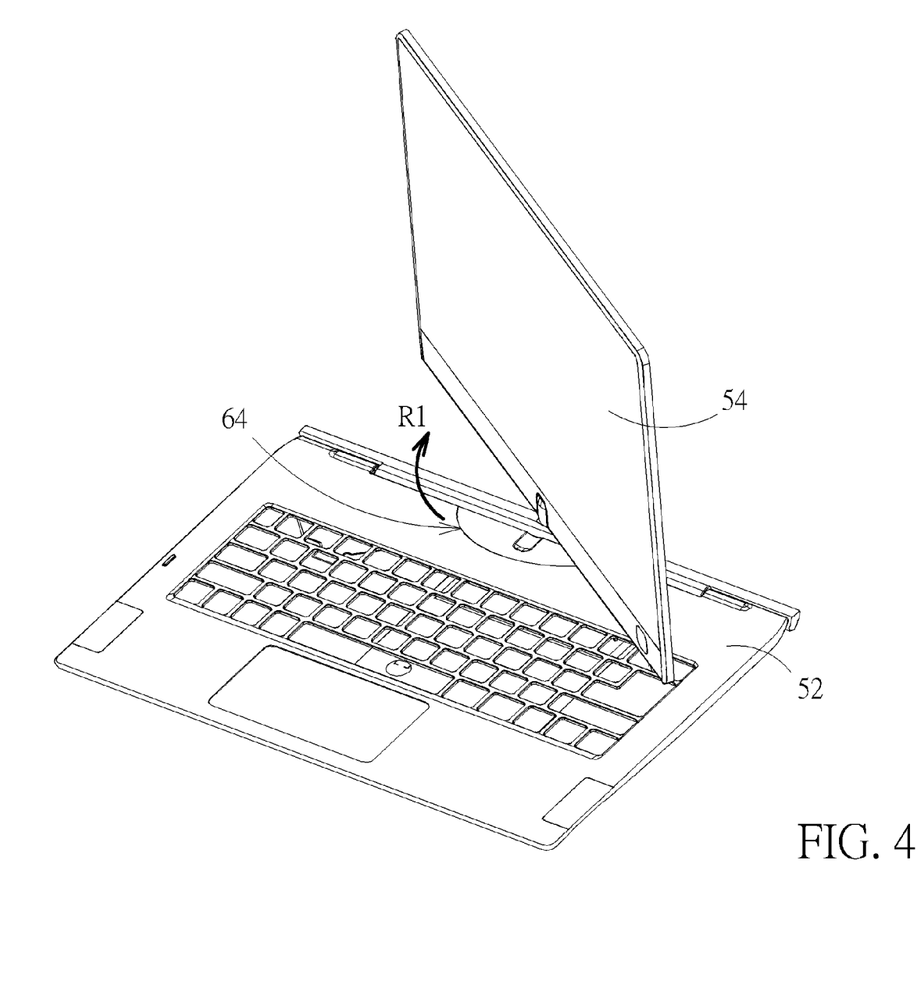
FIG. 4 is a diagram of a display module pivoting relative to a host module in a first pivoting direction according to the embodiment of the present invention.
Figure 5:
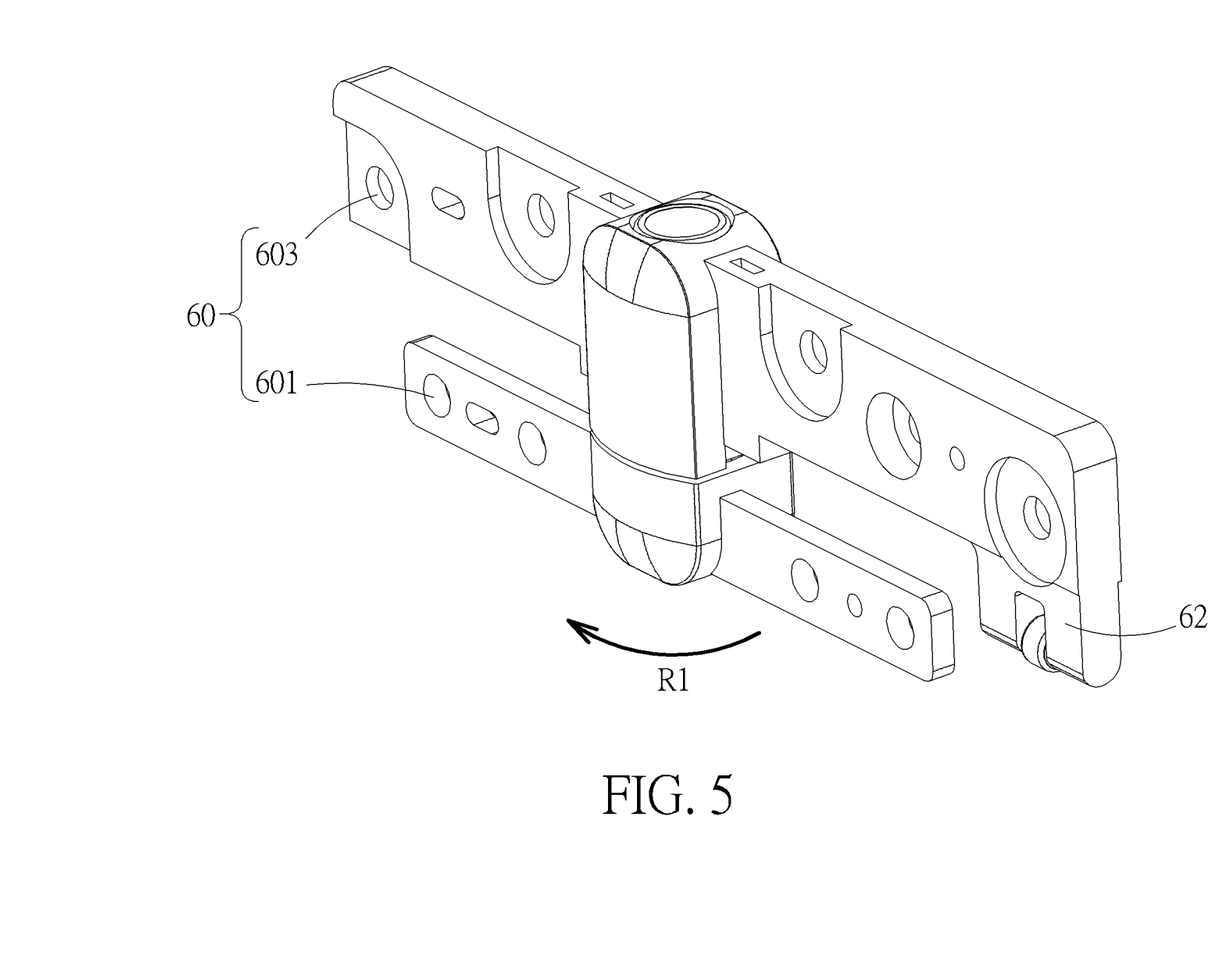
FIG. 5 is a diagram of a pivoting unit according to the embodiment of the present invention.

Please refer to FIG. 2 to FIG. 4. FIG. 2 is an exploded diagram of the portable electronic device 50 according to the embodiment of the present invention. FIG. 3 is a partial structural diagram of the portable electronic device 50 according to the embodiment of the present invention. FIG. 4 is a diagram of the display module 54 pivoting relative to the host module 52 in a first pivoting direction R1 according to the embodiment of the present invention. The pivoting mechanism 56 includes a base 58 and a pivoting unit 60. Please refer to FIG. 5 at one time. FIG. 5 is a diagram of the pivoting unit 60 according to the embodiment of the present invention. The pivoting unit 60 includes a lower pivoting component 601 and an upper pivoting component 603. The lower pivoting component 601 is installed on the base 58, and the upper pivoting component 603 is pivotally connected to the lower pivoting component 601 in a first pivoting direction R1 and installed on the display module 54, so that the display module 54 can rotate relative to the host module 52 in the first pivoting direction R1.

Figure 6:
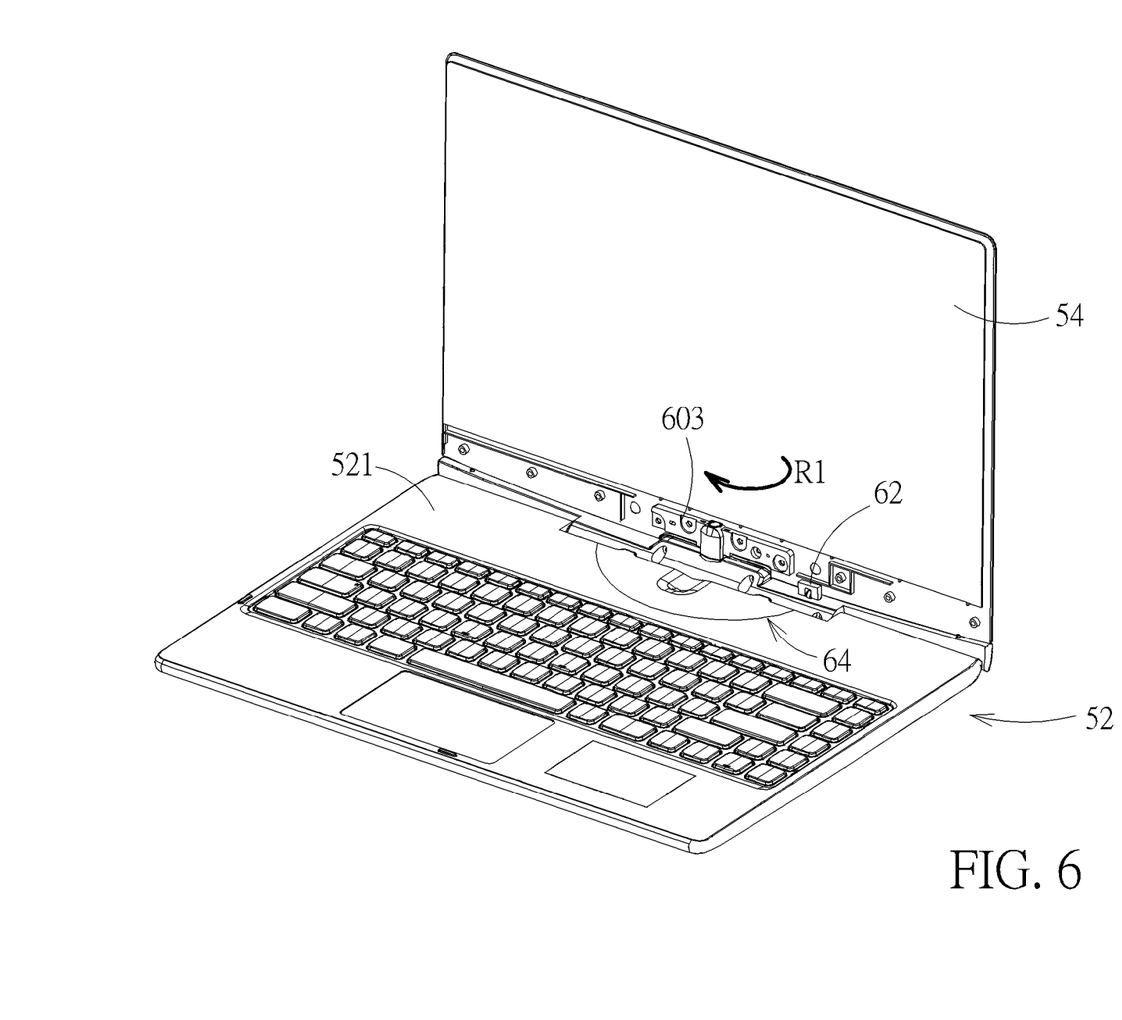
FIG. 6 is a partial structural diagram of a portable electronic device according to another embodiment of the present invention.

In addition, the pivoting mechanism 56 further includes a moving component 62. The moving component 62 is installed on a side of the display module 54. When the display module 54 rotates relative to the host module 52 in the first pivoting direction R1, the moving component 62 contacts an upper surface 521 of the host module 52 and moves relative to the upper surface 521 of the host module 52 to support the display module 54 to rotate stably relative to the host module 52 in the first pivoting direction R1. When the display module 54 rotates relative to the host module 52 in the first pivoting direction R1, a trace of movement of the moving component 62 moving on the upper surface 521 of the host module 52 is an arc shape. In addition, as shown in FIG. 2 and FIG. 3, a track 64 can be formed on the upper surface 521 of the host module 52 in the position corresponding to the trace of movement of the moving component 62. The track 64 can be a concave formed in an arc shape for guiding the movement of moving component 62. In this embodiment, as shown in FIG. 5, the moving component 62 is connected to a side of the upper pivoting component 603 nearby the lower pivoting component 601, but is not limited to this. For example, please refer to FIG. 6. FIG. 6 is a partial structural diagram of the portable electronic device 50 according to another embodiment of the present invention. The moving component 62 can also be separated from the pivoting unit 60 and be directly connected to the side of the display module 54, so that the moving component 62 can also contact the upper surface 521 of the host module 52 and move relative to the upper surface 521 of the host module 52 for supporting the display module 54 to pivot stably relative to the host module 52 in the pivoting direction R1 when the display module 54 pivots relative to the host module 52 in the first pivoting direction R1.

The moving component 62 in the present invention can be a rolling component and can roll relative to the upper surface 521 of the host module 52 when the display module 54 rotates relative to the host module 52 in the first pivoting direction R1. The rolling component can be a ball or a wheel, and the rolling component can be made of flexible material. For example, the rolling component can be made of rubber, so that the rolling component will not scratch the upper surface 521 of the host module 52 as rolling relative to the upper surface 521 of the host module 52. In this embodiment, the moving component 62 is a wheel, but is not limited to this. The mechanism which rolls relative to the upper surface 521 of the host module 52 when the display module 54 pivots relative to the host module 52 is within the scope of the present invention. In addition, the moving component 62 can be a sliding component and can slide relative to the surface 521 of the host module 52 when the display module 54 pivots relative to the host module 52 in the first pivoting direction R1. For example, the sliding component can be a slider, but is not limited to this. The mechanism which slides relative to the upper surface 521 of the host module 52 when the display module 54 pivots relative to the host module 52 is within the scope of the present invention. If the moving component 62 is a sliding component, the position on the upper surface 521 of the host module 52 corresponding to the trace of movement the moving component 62 can be made of inflexible material for avoiding the moving component 62 from rubbing against the upper surface 521 of the host module 52.

Figure 7:
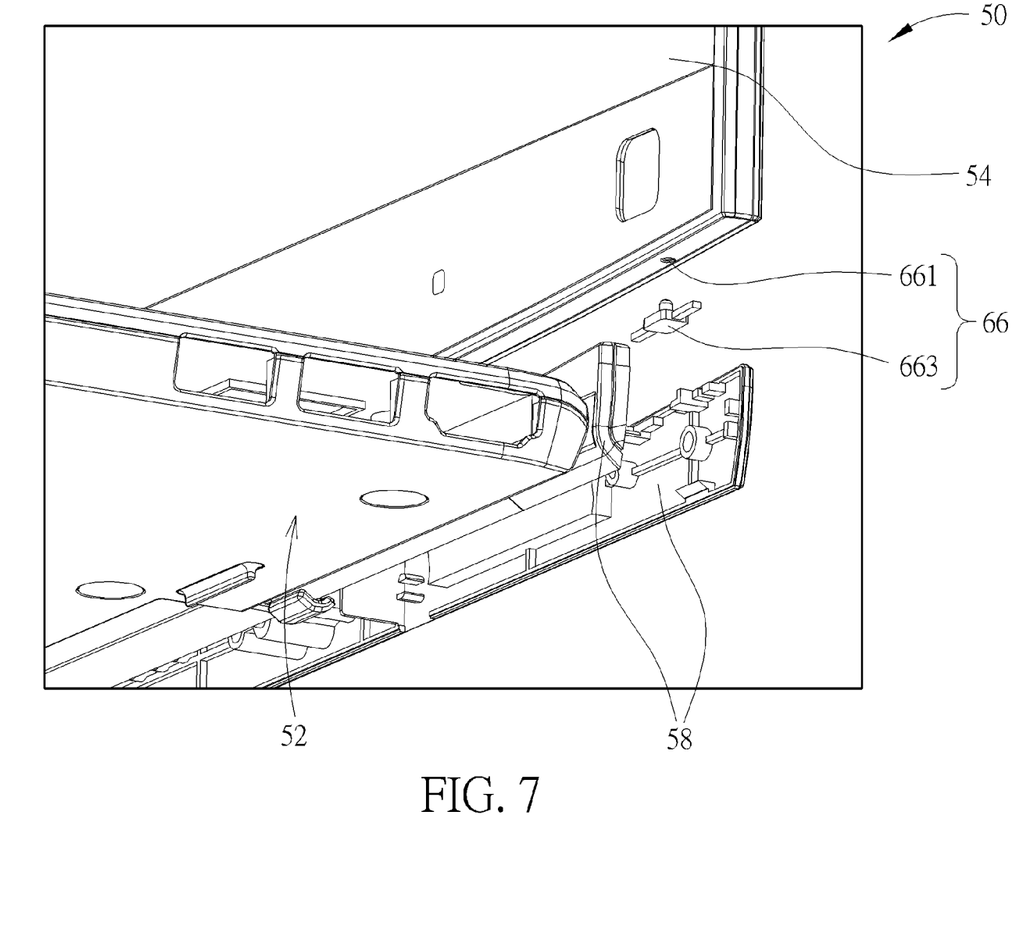
FIG. 7 is a structural diagram of a positioning structure according to the embodiment of the present invention.

Please refer to FIG. 7. FIG. 7 is a structural diagram of a positioning structure 66 according to the embodiment of the present invention. The portable electronic device 50 can further include the positioning structure 66. The positioning structure 66 includes at least one concave structure 661 and at least one positioning component 663. The at least one concave structure 661 is formed at the side of the display module 54. The at least one positioning component 663 is installed on the base 58 and located in a position corresponding to the at least one concave structure 661. The at least one positioning component 663 is to be fixed inside the at least one concave structure 661 for positioning the display module 54 on the host module 52. The positioning component 663 can be made of flexible material, so that the positioning component 663 can be elastically deformed to be fixed or separated from the corresponding concave structure 661. In this embodiment, the portable electronic device 50 includes two concave structures 661 and two positioning components 663 that are installed respectively on two sides of the display module 54 and the host module 52 for positioning the display module 54 on the host module 52 symmetrically and stably. The structure design of the positioning structure 66 is not limited to the description of this embodiment. The structures which are able to position the display module 54 on the host module 52 are within the scope of the present invention.

Figure 8:
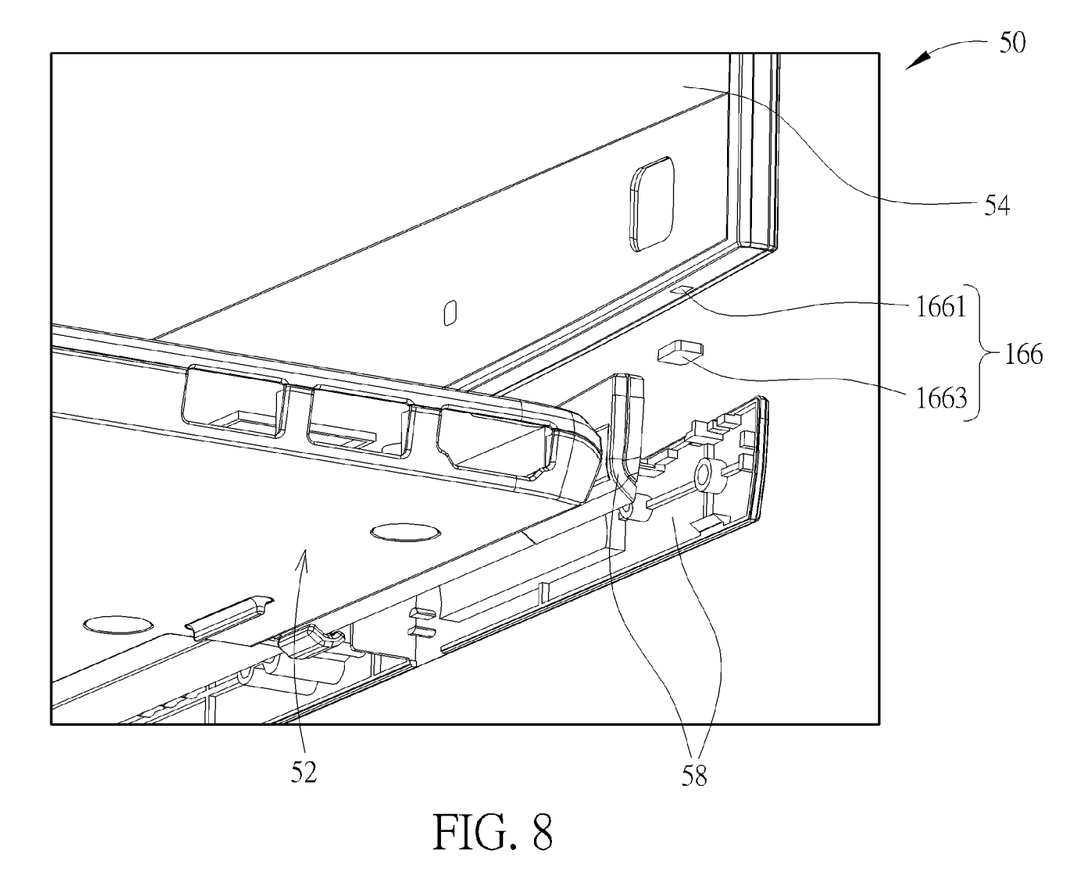
FIG. 8 is a structural diagram of a positioning structure according to another embodiment of the present invention.

For example, please refer to FIG. 8. FIG. 8 is a structural diagram of a positioning structure 166 according to another embodiment of the present invention. The positioning structure 166 of this embodiment includes at least one first magnetic component 1661 and at least one second magnetic component 1663. The at least one first magnetic component 1661 is installed on the display module 54. The at least one second magnetic component 1663 is installed on the base 58 and located in a position corresponding to the at least one first magnetic component 1661. The at least one second magnetic component 1663 attracts the at least one first magnetic component 1661 for positioning the display module 54 on the host module 52. The at least one first magnetic component 1661 and the at least one second magnetic component 1663 can respectively be a magnet. In this embodiment, the positioning structure 166 can include two first magnetic component 1661 and two second magnetic component 1663 installed respectively on the two sides of the display module 54 and the base 58 for positioning the display module 54 on the host module 52 symmetrically and stably.

Figure 9:
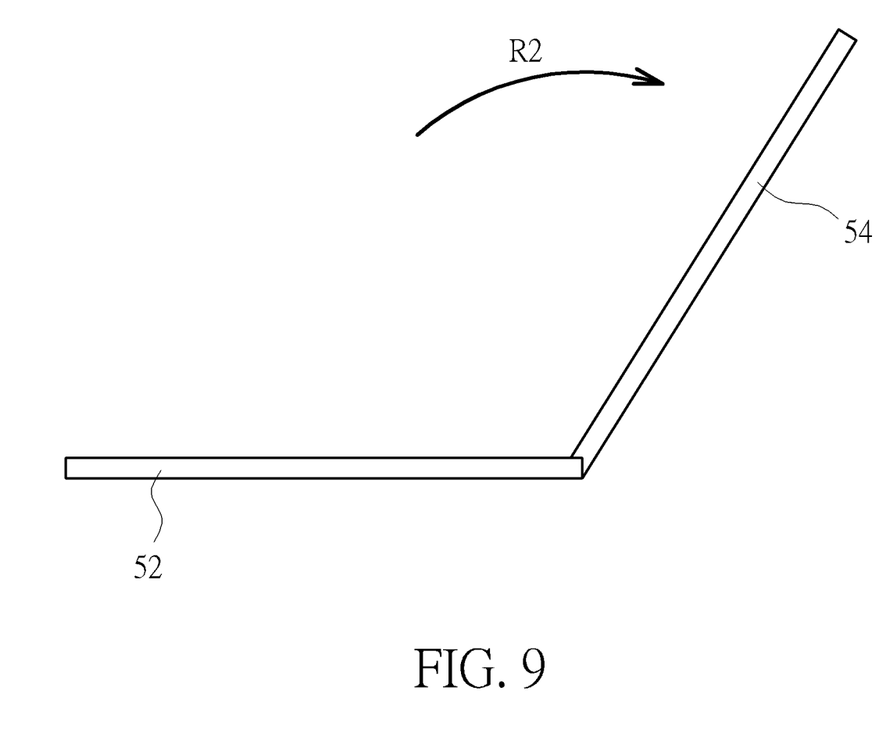
FIG. 9 is a diagram of the display module pivoting relative to the host module in a second pivoting direction according to the embodiment of the present invention.

Please refer to FIG. 1 to FIG. 9. FIG. 9 is a diagram of the display module 54 pivoting relative to the host module 52 in a second pivoting direction R2 according to the embodiment of the present invention. The portable electronic device 50 in the present invention further includes two hinge components 68 that are respectively installed on two sides of the pivoting unit 60 and inside the base 58, and the two hinge components 68 are for pivoting the display module 54 relative to the host module 52 in the second pivoting direction R2 different from the first pivoting direction R1. The second pivoting direction R2 can be perpendicular to the first pivoting direction R1. When a user wants to use the portable electronic device 50 in a tablet computer mode, the display module 54 can be pivoted relative to the host module 52 in the second pivoting direction R2 as shown in FIG. 9, so as to open the display module 54 relative to the host module 52. Then the user can pivot the display module 54 relative to the host module 52 in the first pivoting direction R1 for 180 degrees, and the display module 54 can be positioned on the host module 52 by the positioning structure 66. Then, the display module 54 is pivoted relative to the host module 52 in a direction opposite to the second pivoting direction R2 to superpose the display module 54 on the host module 52, so that the portable electronic device 50 can be used as a tablet computer.

In contrast to the prior art, the portable electronic device of the present invention includes the moving component on the side of the display module for contacting the upper surface of the host module when the display module pivots relative to the host module in the first pivoting direction so as to support the display module to pivot relative to the host module stably in the first pivoting direction. It can solve a conventional problem that the conventional display module sways easily so that the bottom of the conventional display module collides with the upper surface of the host module and the keyboard to scratch the host module and the keyboard when the display module rotates relative to the host module as the conventional pivoting mechanism is disposed in the center of the display module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device comprising:
   a host module comprising an upper surface, and a track being formed on the upper surface;
   a display module pivoted to the host module; and
   a pivoting mechanism connected to the host module and the display module and for pivoting the host module relative to the display module, the pivoting mechanism comprising:
   a base;
   a pivoting unit comprising:
      a lower pivoting component installed on the base; and
      an upper pivoting component pivotally connected to the lower pivoting component in a first pivoting direction and installed on the display module, so that the display module rotates relative to the host module in the first pivoting direction; and
   a moving component installed on a side of the display module, the moving component continuously contacting the upper surface of the host module and moving relative to the upper surface of the host module as the display module rotates relative to the host module in the first pivoting direction, and the track being for guiding movement of the moving component.

2. The portable electronic device of claim 1, wherein the moving component is connected to the upper pivoting component.

3. The portable electronic device of claim 1, wherein the moving component is connected to the side of the display module.

4. The portable electronic device of claim 3, wherein the moving component is separated from the pivoting unit and connected to the side of the display module.

5. The portable electronic device of claim 1, wherein the moving component is a rolling component or a sliding component.

6. The portable electronic device of claim 5, wherein the rolling component is a ball or a wheel.

7. The portable electronic device of claim 1, wherein the track is formed in an arc shape.

8. The portable electronic device of claim 1, wherein the pivoting mechanism further comprises a positioning structure comprising:
   at least one concave structure formed on the side of the display module; and
   at least one positioning component installed on the base in a position corresponding to the at least one concave structure, the at least one positioning component being fixed inside the at least one concave structure for positioning the display module on the host module.

9. The portable electronic device of claim 8, wherein the at least one positioning component is made of flexible material.

10. The portable electronic device of claim 1, wherein the pivoting mechanism further comprises a positioning structure comprising:
    at least one first magnetic component installed on the side of the display module; and
    at least one second magnetic component installed on the base in a position corresponding to the at least one first magnetic component, the at least one second magnetic component attracting the at least one first magnetic component for positioning the display module on the host module.

11. The portable electronic device of claim 1, further comprising two hinge components respectively installed on two sides of the pivoting unit and inside the base, the two hinge components being for pivoting the display module relative to the host module in a second pivoting direction different from the first pivoting direction.

12. A pivoting mechanism connected to a host module and a display module of the portable electronic device, the pivoting mechanism being for pivoting the host module relative to the display module, the pivoting mechanism comprising:
   a base;
   a pivoting unit comprising:
      a lower pivoting component installed on the base; and
      an upper pivoting component pivotally connected to the lower pivoting component in a first pivoting direction and installed on the display module, so that the display module rotates relative to the host module in the first pivoting direction; and
   a moving component installed on a side of the display module, the moving component continuously contacting an upper surface of the host module and moving relative to the upper surface of the host module as the display module rotates relative to the host module in the first pivoting direction.

13. The pivoting mechanism of claim 12, wherein the moving component is connected to the upper pivoting component.

14. The pivoting mechanism of claim 12, wherein the moving component is connected to the side of the display module.

15. The pivoting mechanism of claim 14, wherein the moving component is separated from the pivoting unit and connected to the side of the display module.

16. The pivoting mechanism of claim 12, wherein a track is formed on the upper surface of the host module and for guiding movement of the moving component.

17. The pivoting mechanism of claim 12, further comprising a positioning structure comprising:
   at least one concave structure formed on the side of the display module; and
   at least one positioning component installed on the base in a position corresponding to the at least one concave structure, the at least one positioning component being fixed inside the at least one concave structure for positioning the display module on the host module.

18. The pivoting mechanism of claim 12, further comprising a positioning structure comprising:
   at least one first magnetic component installed on the side of the display module; and
   at least one second magnetic component installed on the base in a position corresponding to the at least one first magnetic component, the at least one second magnetic component attracting the at least one first magnetic component for positioning the display module on the host module.

19. The pivoting mechanism of claim 12, further comprising two hinge components respectively installed on two sides of the pivoting unit and inside the base, the two hinge components being for pivoting the display module relative to the host module in a second pivoting direction different from the first pivoting direction.

* * * * *